United States Patent
Bajaj et al.

(10) Patent No.: US 8,929,039 B2
(45) Date of Patent: Jan. 6, 2015

(54) SILICON CONTROLLED RECTIFIER (SCR) CLAMP INCLUDING METAL INSULATOR TRANSITION (MIT) RESISTOR

(75) Inventors: Mohit Bajaj, Bangalore (IN); Rahul Nayak, Bangalore (IN); Edward J. Nowak, Essex Junction, VT (US); Rajan K. Pandey, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 13/479,328

(22) Filed: May 24, 2012

(65) Prior Publication Data

US 2013/0314825 A1    Nov. 28, 2013

(51) Int. Cl.
*H01L 49/00* (2006.01)
(52) U.S. Cl.
USPC ............................. 361/56; 361/91.1; 361/111
(58) Field of Classification Search
CPC ...................................................... H01L 27/003
USPC ............................................. 361/56, 91.1, 111
See application file for complete search history.

(56) References Cited

U.S. PATENT DOCUMENTS

| | | | |
|---|---|---|---|
| 4,229,775 A | 10/1980 | Miller | |
| 6,008,508 A | 12/1999 | Bergemont et al. | |
| 6,365,940 B1 | 4/2002 | Duvvury et al. | |
| 6,768,616 B2 * | 7/2004 | Mergens et al. | 361/56 |
| 6,890,766 B2 * | 5/2005 | Doderer et al. | 438/2 |
| 6,933,553 B2 | 8/2005 | Kim et al. | |
| 7,274,047 B2 * | 9/2007 | Russ et al. | 257/133 |
| 7,489,492 B2 * | 2/2009 | Kim et al. | 361/111 |
| 7,617,467 B2 * | 11/2009 | Bell et al. | 716/106 |
| 7,663,190 B2 | 2/2010 | Vinson | |
| 2009/0230940 A1 * | 9/2009 | Lim et al. | 323/304 |
| 2011/0018607 A1 | 1/2011 | Kim et al. | |

OTHER PUBLICATIONS

G. Bolanos et al., Electrical and optical properties of VO2 thin films, Art: W0000/AutorD:\GILBERTO\CONGRESOS\tnm Workshop\tnm-electrical and optical properties VO2 thin films.doc, Jan. 27, 2007, 6 pages.
B.G. Chae et al., Fabrication and Electrical Properties of Pure VO2 Phase Films, Journal of the Korean Physical Society, vol. 44, No. 4, Apr. 2004, pp. 884-888.
Bong-Jun Kim et al., VO2 Thin-Film Varistor Based on Metal-Insulator Transition, IEEE Electron Device Letters, vol. 31, No. 1, Jan. 2010, pp. 14-16.

* cited by examiner

*Primary Examiner* — Zeev V Kitov
(74) *Attorney, Agent, or Firm* — David A. Cain; Hoffman Warnick LLC

(57) ABSTRACT

Aspects of the invention provide for an electrostatic discharge (ESD) clamp. In one embodiment, the ESD clamp includes: a silicon controlled rectifier (SCR); and a trigger circuit for providing a tunable trigger voltage to turn on the SCR, the trigger circuit including a metal-insulator transition (MIT) material. The trigger circuit includes an MIT resistor that includes a width and a length that tunes the trigger voltage to a desired voltage.

14 Claims, 3 Drawing Sheets

SILICON CONTROLLED RECTIFIER (SCR) CLAMP INCLUDING METAL INSULATOR TRANSITION (MIT) RESISTOR

FIELD OF THE INVENTION

The disclosure relates generally to silicon controlled rectifier (SCR) clamps, and more particularly, to a SCR clamp including a metal insulator transition (MIT) resistor.

BACKGROUND

A silicon controlled rectifier (SCR) clamp is a device often manufactured on-chip to provide electrostatic discharge (ESD) protection. SCR clamps have a large off-resistance, a very low on-resistance, snapback characteristics, and a relatively high turn-on voltage. Therefore, SCR clamps offer excellent protection against ESD events in applications where a high voltage swing is required. Different applications require different voltage swings to be tolerated on the signal or power line. Hence, a tunable trigger voltage is a key feature that is desired for an SCR clamp.

A conventional ESD protection device 1 including a conventional SCR clamp 10, using two bipolar junction transistors (BJTs) 112, 114, in a positive feedback configuration, is shown in FIG. 1. The turn-on, trigger voltage of this SCR clamp 10, by itself, is not tunable. However, external trigger circuits may be used to tune the trigger voltage. For example, a Diode Trigger SCR (DTSCR) clamp uses diodes to tune the trigger voltage. Alternatively, a Grounded Gate Triggered SCR (GGSCR) clamp uses transistors to tune the trigger voltage. FIG. 1 shows a conventional trigger circuit 20 including a diode and a p-type field-effect transistor (pFET).

BRIEF SUMMARY

Aspects of the invention provide for an electrostatic discharge (ESD) clamp. In one embodiment, the ESD clamp includes: a silicon controlled rectifier (SCR); and a trigger circuit for providing a tunable trigger voltage to turn on the SCR, the trigger circuit including a metal-insulator transition (MIT) material. The trigger circuit includes an MIT resistor that includes a width and a length that tunes the trigger voltage to a desired voltage.

A first aspect of the disclosure provides an electrostatic discharge (ESD) clamp, comprising: a silicon controlled rectifier (SCR); and a trigger circuit for providing a tunable trigger voltage to turn on the SCR, the trigger circuit including a metal-insulator transition (MIT) material.

A second aspect of the disclosure provides an integrated circuit (IC), comprising: a plurality of electrostatic discharge (ESD) clamps for protecting the IC, each of the ESD clamps comprising: a silicon controlled rectifier (SCR); and a trigger circuit for providing a tunable trigger voltage to turn on the SCR, the trigger circuit including a metal-insulator transition (MIT) material.

A third aspect of the disclosure provides a design structure tangibly embodied in a machine readable medium for designing, manufacturing, or testing an integrated circuit (IC), the design structure comprising: a plurality of electrostatic discharge (ESD) clamps for protecting the IC, each of the ESD clamps comprising: a silicon controlled rectifier (SCR); and a trigger circuit for providing a tunable trigger voltage to turn on the SCR, the trigger circuit including a metal-insulator transition (MIT) material.

BRIEF DESCRIPTION OF THE DRAWINGS

The above and other aspects, features and advantages of the disclosure will be better understood by reading the following more particular description of the disclosure in conjunction with the accompanying drawings.

Figure 1:
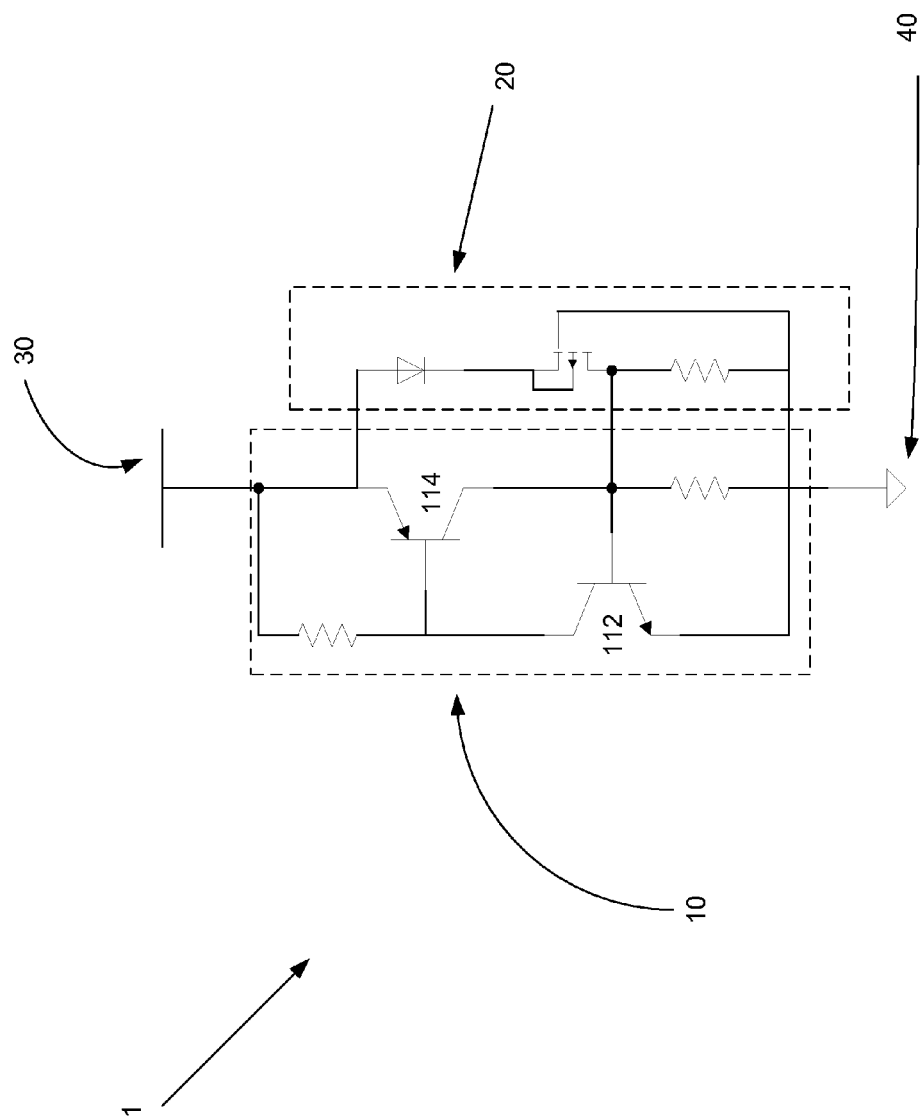
FIG. 1 shows a schematic view of a conventional ESD protection device.

The drawings are not necessarily to scale. The drawings are merely schematic representations, not intended to portray specific parameters of the disclosure. The drawings are intended to depict only typical embodiments of the disclosure, and therefore should not be considered as limiting the scope of the disclosure. In the drawings, like numbering represents like elements.

DETAILED DESCRIPTION

As mentioned, the disclosure relates generally to silicon controlled rectifier (SCR) clamps, and more particularly, to a SCR clamp including a metal insulator transition (MIT) resistor.

A silicon controlled rectifier (SCR) clamp is a device often manufactured on-chip to provide electrostatic discharge (ESD) protection. SCR clamps have a large off-resistance, a very low on-resistance, snapback characteristics, and a relatively high turn-on voltage. Therefore, SCR clamps offer excellent protection against ESD events in applications where a high voltage swing is required. Different applications require different voltage swings to be tolerated on the signal or power line. Hence, a tunable trigger voltage is a key feature that is desired for an SCR clamp.

A conventional ESD protection device 1, including a SCR clamp 10, using two bipolar junction transistors (BJTs) 112, 114, in a positive feedback configuration, is shown in FIG. 1. The turn-on, trigger voltage of this SCR clamp 10 by itself is not tunable. However, external trigger circuits may be used to tune the trigger voltage. For example, a Diode Trigger SCR (DTSCR) clamp uses diodes to tune the trigger voltage. Alternatively, a Grounded Gate Triggered SCR (GGSCR) clamp uses transistors to tune the trigger voltage. FIG. 1 shows a conventional trigger circuit 20 including a diode and a p-type field-effect transistor (pFET).

While the diodes in the trigger circuit of a conventional DTSCR clamp easily tune the trigger voltage of an SCR, the trigger voltage is dependent upon the number of diodes used in the trigger circuit. Further, in a GGSCR clamp, many large transistors are needed to tune the trigger voltage, which can lead to undesired current leakage.

Aspects of the invention provide for an electrostatic discharge (ESD) clamp. In one embodiment, the ESD clamp includes: a silicon controlled rectifier (SCR); and a trigger circuit for providing a tunable trigger voltage to turn on the SCR, the trigger circuit including a metal-insulator transition (MIT) material. The trigger circuit includes an MIT resistor that includes a width and a length that easily tunes the trigger voltage to a desired voltage.

Figure 2:
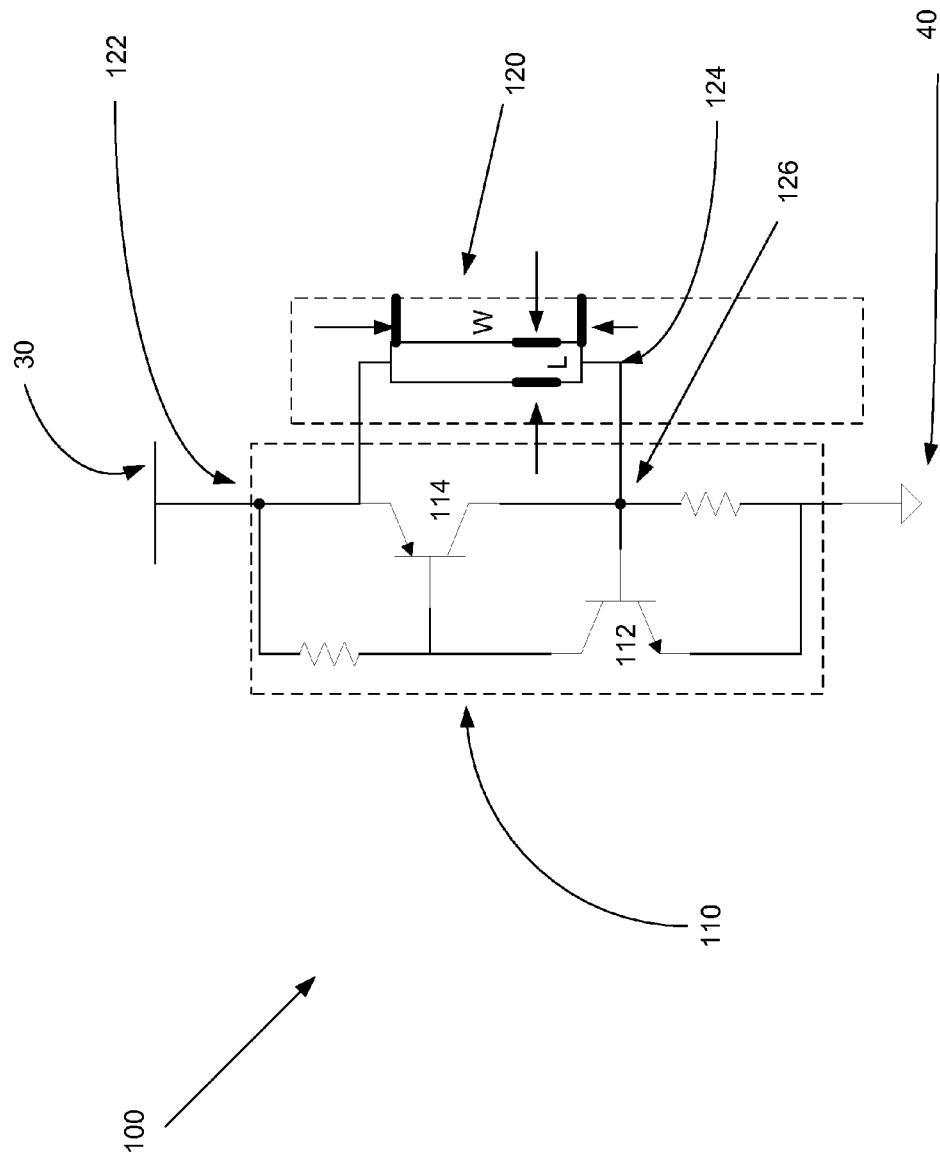
FIG. 2 shows a schematic view of an ESD protection device according to embodiments of the invention.

Turning now to FIG. 2, a schematic view of an ESD clamp 100 according to embodiments of the invention is shown. The ESD clamp 100 includes a silicon controlled rectifier (SCR) 110 and a trigger circuit 120. Both the SCR 110 and the trigger circuit 120 are positioned between a power supply 30 and ground 40. The SCR 110 includes a first bipolar junction transistor 112 and a second bipolar junction transistor 114. The first transistor 112, which is directly connected to ground 40, is a npn transistor, while the second transistor 114, which is directly connected to the power supply 30, is a pnp transistor. The trigger circuit 1 the 20 is positioned across the second transistor 114. That is, one side 122 of the trigger circuit 120 is directly connected to the power supply 30 (and anode of the SCR 110). Further, the second side 124 of the trigger circuit 120 is directly connected to the gate 126 of the SCR 110 (i.e., the gate 126 of the transistor 112). It is understood that SCR 110 is shown to include first transistor 112 and second transistor 114, and that this is for exemplary purposes only to show an equivalent circuit for the SCR 110. SCR 110 may include other electrical devices not shown in FIG. 2.

In operation, the trigger circuit 120 provides a tunable trigger voltage to turn on the SCR 110 during an ESD event. The trigger circuit 120 may include a metal insulator transition (MIT) material, such as, but not limited to, vanadium dioxide ($VO_2$), and takes the form of a resistor. A metal insulator transition (MIT) material is a material that transitions from a metal to an insulator by some ambient parameter, such as, for example, an electric field (i.e., an ESD event), and an increase or decrease in temperature. Other examples of MIT materials include $V_2O_5$ and $V_2O_3$. However, it is understood that trigger circuit 120 may include other MIT materials not listed herein.

The transition from metal to insulator in the MIT resistor of the trigger circuit 120 changes the resistance of the trigger circuit 120, which, consequently, turns on and off the SCR 110. A very high resistance keeps the SCR 110 off, while a very low resistance turns the SCR 110 on. In one embodiment, the resistance of the MIT material of the trigger circuit 120 changes, for example, four orders of magnitude from the metal phase to the insulator phase, from a large resistance when the SCR 110 is off, to a small resistance when the SCR 110 is on. The MIT material of the trigger circuit 120 also includes a very fast and abrupt switching time. For example, the MIT material of the trigger circuit 120 may have a switching time in the order of 0.1 nanoseconds.

As seen in FIG. 2, the MIT resistor (i.e., trigger circuit 120), includes a width "W" and a length "L." The width and the length of the MIT resistor can be modified to easily change the voltage at which the SCR 110 clamps at. For example, the metal to insulator transition voltage will increase (i.e., the voltage at which the SCR 110 clamps at) when the width "W" increases. The relationship between the width "W" and a voltage at which the trigger circuit 120 (i.e., the MIT resistor) transitions from a metal to an insulator is linear according to the following: $V_{transition} = E_{critical} * W$, wherein $E_{critical}$ is the critical electric field (i.e., the ESD event). The resistance of the trigger circuit 120, as the transition voltage, also increases with the increase in the width "W." The increase in the length "L" of the MIT resistor (i.e., trigger circuit 120) will, for example, decrease the resistance of the trigger circuit 120, and also, decrease the voltage at which the SCR 110 clamps at.

Figure 3:
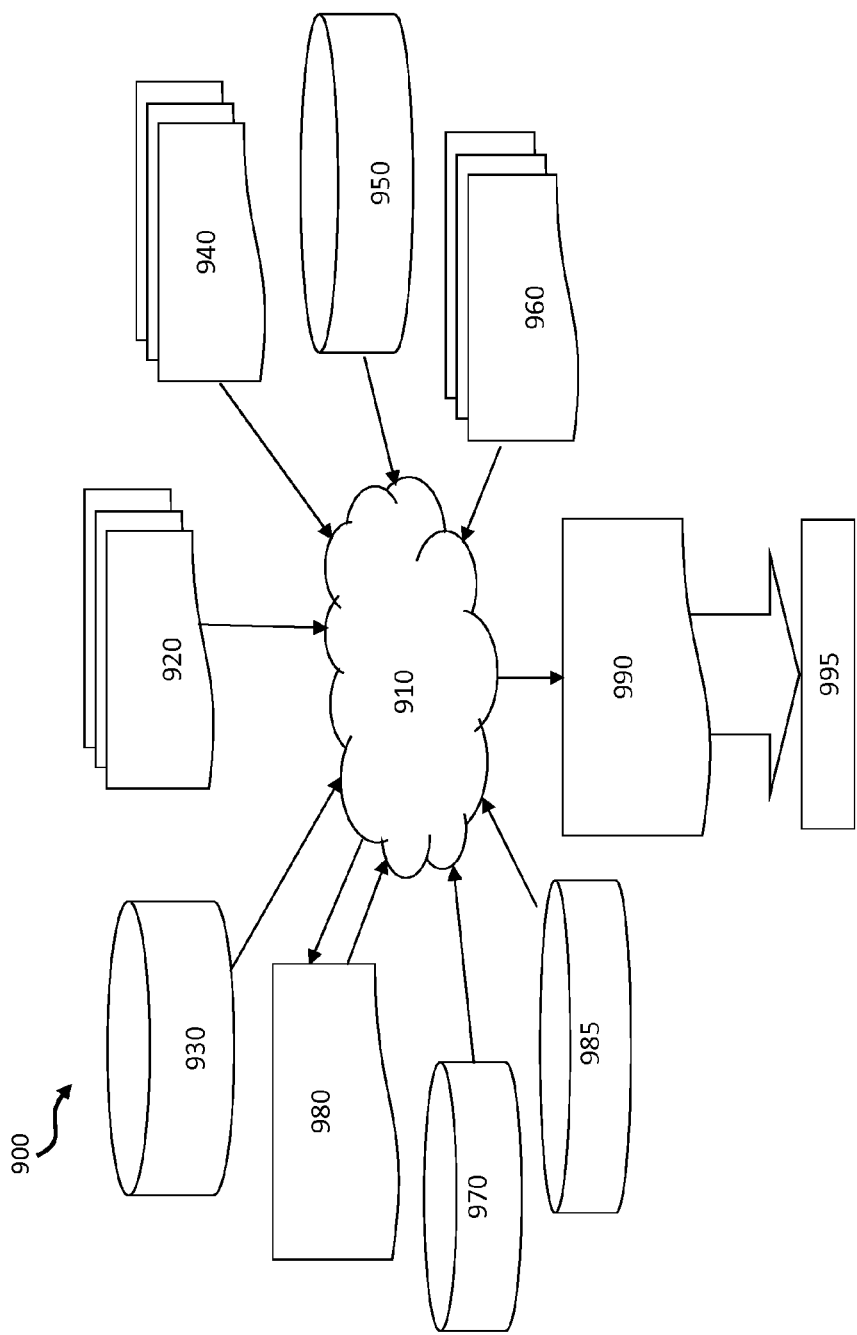
FIG. 3 is a flow diagram of a design process used in semiconductor design, manufacture, and/or test according to embodiments of the invention.

FIG. 3 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 1-2. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 3 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1-2. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1-2 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990. Design structure 990 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-2. In one embodiment, design structure 990 may comprise a compiled, executable HDL simulation model that functionally simulates the devices shown in FIGS. 1-2.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-2. Design structure 990 may then proceed to a stage 995 where, for example, design structure 990: proceeds to tape-out, is released to manufacturing, is released to a mask house, is sent to another design house, is sent back to the customer, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrostatic discharge (ESD) clamp, comprising:
a silicon controlled rectifier (SCR); and
a trigger circuit for providing a tunable trigger voltage to turn on the SCR, the trigger circuit including a metal-insulator transition (MIT) resistor, wherein a width and a length of the MIT resistor are varied to tune the trigger voltage to a desired voltage.

2. The ESD clamp of claim 1, wherein the MIT material includes one of the following: vanadium oxide (VO2), V2O5, or V2O3.

3. The ESD clamp of claim 1, wherein the trigger circuit is connected to an anode of the SCR and a gate of the SCR.

4. The ESD clamp of claim 1, wherein a switching time of the trigger circuit is at least 0.1 nanoseconds.

5. An integrated circuit (IC), comprising:
a plurality of electrostatic discharge (ESD) clamps for protecting the IC, each of the ESD clamps comprising:
a silicon controlled rectifier (SCR); and
a trigger circuit for providing a tunable trigger voltage to turn on the SCR, the trigger circuit including a metal-insulator transition (MIT)
resistor, wherein a width and a length of the MIT resistor are varied to tune the trigger voltage to a desired voltage.

6. The IC of claim 5, wherein the MIT material includes one of the following: vanadium oxide (VO2), V2O5, or V2O3.

7. The IC of claim 5, wherein each trigger circuit is connected to an anode of the SCR and a gate of the SCR.

8. The IC of claim 5, wherein a switching time of the trigger circuit is at least 0.1 nanoseconds.

9. A design structure tangibly embodied in a machine readable medium for designing, manufacturing, or testing an integrated circuit (IC), the design structure comprising:
a plurality of electrostatic discharge (ESD) clamps for protecting the IC, each of the ESD clamps comprising:
a silicon controlled rectifier (SCR); and
a trigger circuit for providing a tunable trigger voltage to turn on the SCR, the trigger circuit including a metal-insulator transition (MIT) resistor, wherein a width and a length of the MIT resistor are varied to tune the trigger voltage to a desired voltage.

10. The design structure of claim 9, wherein the MIT material includes one of the following: vanadium oxide (VO2), V2O5, or V2O3.

11. The design structure of claim 9, wherein each trigger circuit is connected to an anode of the SCR and a gate of the SCR.

12. The design structure of claim 9, wherein a switching time of each trigger circuit is at least 0.1 nanoseconds.

13. The design structure of claim 9, wherein the design structure comprises a netlist.

14. The design structure of claim 9, wherein the design structure resides on storage medium as a data format used for the exchange of layout data of integrated circuits.

* * * * *